Patented Nov. 12, 1940

2,221,650

UNITED STATES PATENT OFFICE

2,221,650

PROCESS OF MOLDING POLYSULPHIDE POLYMERS

Joseph C. Patrick, Morrisville, Pa., assignor to Thiokol Corporation, Yardville, N. J., a corporation of Delaware No Drawing. Application December 9, 1937, Serial No. 179,015

2 Claims. (Cl. 260—79)

This invention relates to a new synthetic plastic having a very high degree of utility in the arts due to its combination of special properties. The generic chemical constitution of the basic material of the present invention has a certain general outline common to all species.

Houses have certain general outlines in common, yet the comfort and utility of a house depends to a large extent on the manner in which the individual rooms and other parts of the house are constructed and arranged.

So in my invention, within the general outline or structure common to the molecule of my synthetic compound, I have found that I can vary the nature and arrangement of the atoms, to adapt the properties of the compound to a variety of special uses.

This controlled adaptability is one of the features of this invention and as a result thereof products having a variety of different uses can be produced as indicated by the following list:

Oil and solvent proof gaskets, washers, etc., tubing and hose, resilient rolls such as printers' rollers, elastic sheets, etc. The material has also been pressed into cloth, asbestos and other textile fiber to form laminated articles, pump diaphragms and such materials.

The plastic materials described herein have been made into printing plates and other complex shapes such as molded electrical insulative parts to which use its particular physical character peculiarly fits it.

This invention is a continuation-in-part of my copending application Serial No. 38,209, filed August 28, 1935, and Serial No. 107,167, filed October 23, 1936.

Another feature is the rapidity with which articles can be produced, e. g. by molding the product of my invention. This is a matter of great commercial importance because of the economics of the molding operation. In this operation, a workman places a charge of plastic material in a metallic mold in which the plastic is heated and pressed until it can be safely removed from the mold. The cost of the finished article, apart from the cost of the plastic material, depends upon the number of molded articles which can be produced per man, per hour, per mold.

Thus if an article requires 50 minutes in the mold, the production cost of the article is much greater than that of one which requires only 5 minutes.

To attain products having the properties hereinafter illustratively set forth by a quick molding operation, i. e. a combination of these qualities with production speed, is, I believe, an important forward step in the plastic industry.

Another feature is the fact that results can be attained thereby otherwise not capable of realization.

Until the present invention, the production of articles having a high degree of resiliency, resembling vulcanized rubber in this respect, by a forming operation requiring only a few moments' application of heat and pressure, has never been attained. Attempts to do this with natural rubber have been unsuccessful. For example, particles of cured rubber will not satisfactorily coalesce without the use of a binder and in that case the rubber acts largely as a filler, the real molding material being the binder.

In accordance with the present invention, an autogeneous welding of the articles may be effected at moderate temperatures and pressure, yielding the totally unpredictable result that a formed article is produced having a perfectly continuous single phase structure and possessing the same, or better, physical properties such as tensile strength, elongation, resistance to tear, etc., than the cured material possessed before being reduced to the powdered state.

As to the general outline of structure of the synthetic material, it is at least in its intermediate form represented as follows:

$$HS.R.S_x.R. \ldots . S_x.R.S_x.R.SH$$

R stands for an organic radical. $S_x$ signifies a group of sulphur atoms, e. g., two to six. Thus the general outline of the structure of the said material can be described as an organic radical alternating with a group of sulphur atoms and constituting a long chain molecule. By varying the number of sulphur atoms in the group thereof and/or by varying the nature of the organic radical R, material having special and unique properties can be obtained.

To illustrate how said properties may be obtained coupled with high speed production of molded articles, made therefrom, an example will be given, the word "polymer" used therein meaning the organic polymer in intermediate form having the general structure above described and produced as hereinafter fully set forth.

Example 1

| | Parts by weight |
|---|---|
| Polymer | 100.00 |
| Zinc oxide | 10.00 |
| Carbon black | 60.00 |
| Stearic acid | .50 |
| Benzo thiazyl disulphide (Altax) | .25 |

The above ingredients are mixed by mastication and the resulting mixture formed into sheets.

The zinc oxide acts as an oxidizing agent. Instead of ZnO, other oxidizing agents can be used including oxides and peroxides of lead, bismuth, arsenic, manganese, various oxidizing salts, e. g. bichromates, perborates, etc., and organic oxidizing agents including organic peroxides and nitro and polynitro compounds.

Example 2.—This material is heated, e. g. to around 300° F. for about an hour. It undergoes a transformation which develops its desirable properties. This transformation can be called curing. In the intermediate form above mentioned, these properties are inchoate. In the cured form these properties become developed or consummate. They include toughness, elasticity and resistance to permanent deformation.

Formerly, the product sold by the manufacturer was the intermediate polymer above mentioned. He sold it to the consumer who mixed it as in the above Example 1 and cured it as in Example 2. This is still the procedure for many purposes. But for molded articles, the long time of the curing process was a disadvantage because of the cost.

Molds, especially those of the more intricate designs for which this material is uniquely suited, are expensive and the process which substitutes a simple molding operation of say, five minutes, for the more complex curing and forming operation requiring from 50 to 60 minutes, gives a tenfold output per mold or conversely reduces the cost of the molds required for a given capacity to one-tenth. The same economies apply to the presses and labor required.

I have found that the cured material produced as for instance in Example 2 can be reformed. For example, the fully cured material may be comminuted or powdered and the material so produced reformed very quickly. Not only are the valuable properties not impaired but in most cases are enhanced. What formerly was the molder's finished product now becomes his raw material so far as the substance is concerned. He no longer carries out the time consuming curing operation in molds. The curing operation is carried out by the manufacturer of the polymer. This polymer is cured in bulk rather than molds and the molder buys a cured material. In the curing operation, by using large open steam curers or vulcanizers, one man can cure tons of the material, i. e., the output per man per hour is very high, far greater than the output per man per hour if the curing occurred in molds.

This cured material above mentioned possesses the unsuspected and unique capability of being remolded.

In accordance with my invention, three stages or steps are undertaken, to wit:
1. Production of polymer.
2. Curing of polymer.
3. Remolding of the cured polymer to yield a formed elastic article.

Example 2 above illustrates the curing step. The remolding of the cured polymer is illustrated by the following example.

Example 3.—The product produced as in Example 2 is ground to a powder or comminuted into particles of a convenient size. The powder is then placed in a mold and heated and pressed therein for a period, of say 2 to 10 minutes (depending on the size of the article). It may then be removed from the mold without cooling, i e., "dropped hot."

This invention utilizes the discovery that, after the curing step, the cured material still retains the capacity to undergo a reforming operation; that after the curing step the cured material can be taken apart or disintegrated and put together again; that the putting together involves no loss of valuable properties, but, on the contrary, an enhancement of such properties; that such putting together can be accomplished in a fraction of the time required for the curing operation with resulting marked economic and technical gains.

Furthermore, the divided and pulverulent form of this molding material permits the escape of air and gases from the article during the molding process and allows the forming of highly complex articles with perfect fidelity to the mold contour which would not be possible if a solid piece of material were placed in the mold.

The initial polymer may be obtained by various means illustrated by the following:

(a) Reaction of an alkaline polysulphide with an organic compound having a substituent on each of two different carbon atoms which substituent is split off during the reaction. This reaction produces a polymer having an organic radical alternating with a group of three, four, five or six sulphur atoms, depending on the particular alkaline polysulphide employed.

(b) Process according to (a) followed by a partial desulphurization. This results in a polymer having a pair of sulphur atoms alternating with an organic radical.

(c) Oxidation of poly functional mercaptans, i. e., organic bodies having —SH groups attached to each of two or more different carbon atoms. This leads to a product having a pair of sulphur atoms alternating with an organic radical.

There are other methods of producing the polymer, but these will be sufficient to serve as illustrations.

Processes (b) and (c) each lead to a polymer having a pair of sulphur atoms alternating with an organic radical, whereas process (a) is employed to produce a polymer having a group of three or more sulphur atoms alternating with an organic radical. The polymers produced by process (a) are herein called polysulphide polymers and those produced by processes (b) and (c) are herein called disulphide polymers. The respective merits of the disulphide polymers and the polysulphide polymers for the purposes of this invention will be pointed out.

The influence of the nature of the organic radical alternating with the said group of sulphur atoms will also be set forth. This exposition will be assisted by several examples, as follows:

Example 4.—Preparation of a polysulphide polymer. 3000 liters of 2 molar sodium tetrasulphide solution containing 6000 gram mols of the tetrasulphide are treated with 8 kilograms of NaOH followed by 20 kilograms of $MgCl_2.6H_2O$ in a reaction vessel provided with coils for heating and cooling and an agitator. Then 3000 mols or about 297 kilograms of ethylene dichloride are gradually added during about 3 hours at a temperature of about 160° F. After all the ethylene dichloride has been added the temperature is raised to about 200° F. and maintained there for about 3 hours.

The reaction product is then settled and a polymer separates on standing in the form of a latex-like liquid. The mother liquor is siphoned off and the said latex is washed several times with water. This can be done readily because the latex has the peculiar property of mixing intimately with water and then separating out therefrom by gravity. Washing is continued until substantially all water-soluble impurities are removed. The washing is thorough because of the ultramicroscopic size of the particles of polymer in the latex.

The washed latex is then transferred to another vessel and separation of the polymer from the latex in the form of a coagulum is effected therein by adding acid, e. g. until the pH is about 3. The separated coagulum is then masticated on rubber rolls or in a masticator until it is substantially dry. It may then be compounded as in Example 1, cured as in Example 2, and reformed as in Example 3, and after reforming has properties as follows:

Tensile strength_____lbs./sq. in__ 1000
Elongation_____per cent__ 500
Permanent set after elongation_____do__ 20

The reaction of the sodium polysulphide with the ethylene dichloride is one in which the chlorine is split off and its place taken by a polysulphur group. See Equations A to D below. There is no question that this splitting off occurs, because sodium chloride is one of the by-products. Instead of chlorine, other substituents which are split off may be employed, including bromine, iodine, nitrate, sulfate, carbonate, acetate, propionate, etc., and numerous other substituents which are split off in the reaction.

Instead of the ethylene dichloride used in the above example, any member of the list set forth below could be used, X and X' signifying a substituent on each of two different carbon atoms which substituent is split off during the reaction. This list is classified into various classes and the influence of the structure characterizing each class will be described.

*Class A.*—Where there is a saturated hydrocarbon having a replaceable substituent substituted for a hydrogen atom on each of two different carbon atoms, or which the carbon atoms (to which the replaceable substituents are joined) are attached to and separated by straight chain carbon atoms.

$$X(CH_2)_nX'$$

*n* may be 1 to 20 or more $$\underset{X\quad X'}{CH_3.CH.CH.CH_3}$$

2, 3, disubstituted butane $$\underset{X\quad X'}{CH_3.CH.CH_3}$$

2, 3, disubstituted propane $$\underset{X\quad\quad X'}{CH_3.CH_2.CH.CH_2.CH.CH_2.CH_3}$$

3, 5, disubstituted heptane

*Class B.*—Where the carbon atoms (to which the replaceable substituents are joined) are attached to and separated by branched chain saturated carbon atoms.

$$\underset{CH_3}{X.CH_2.CH.CH_2.X'}$$

Disubstituted isobutane $$\underset{\underset{CH_3}{CH_3}}{X.CH_2.CH.CH_2.X'}$$

Disubstituted isopentane

*Class C.*—Where the replaceable carbon atoms (to which the substituents are joined) are attached to and separated by atomic structure characterized by an ether or thio ether linkage.

$$X.C_2H_4.O.C_2H_4.X'$$

Disubstituted ethyl ether $$X.CH_2.O.CH_2X'$$

Disubstituted methyl ether $$X.C_2H_4.O.C_2H_4.OC_2H_4.X'$$

Disubstituted ethoxy ethyl ether $$X.C_2H_4.S.C_2H_4.X'$$

Disubstituted thio ethyl ether $$X.CH_2.S.CH_2.X'$$

Disubstituted thio methyl ether $$\underset{CH_3}{\overset{CH_3}{X.CH_2O.CH_2.C.CH_2.OCH_2.X'}}$$

Disubstituted 1,3 methoxy, 2, 2 dimethyl propane $$X.CH_2.CH_2.CH_2.O.CH_2.O.CH_2.CH_2.CH_2.X'$$

Disubstituted dipropyl formal $$X.CH_2.CH_2.O.CH_2.O.CH_2.CH_2.X'$$

Disubstituted diethylformal $$\underset{X'}{X.CH_2O.CH_2.CH.OCH_2}$$

Disubstituted dimethoxy ethane

Disubstituted para diethoxy benzene $$X.CH_2O.CH_2.CH_2.OCH_2.X'$$

Disubstituted dimethoxy ethane $$X.CH_2.CH_2.CH_2.S.CH_2CH_2.CH_2.X'$$

Disubstituted dipropyl thio ether $$\underset{O}{\overset{\|}{X.CH_2.CH_2.O.C.O.CH_2.CH_2.X'}}$$

Disubstituted diethyl carbonate

*Class D.*—Where the carbon atoms (to which the replaceable substituents are joined) are attached to and separated by atomic structure characterized by unsaturated carbon atoms.

$$X.CH_2-CH=CH.CH_2X$$

Disubstituted butene 2, 3

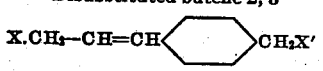

Disubstituted 3 tolyl propane 2,3

*Class E.*—Where the carbon atoms (to which the replaceable substituents are joined) are attached to and separated by atomic structure characterized by an aryl group.

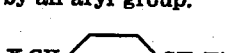

Disubstituted para xylene

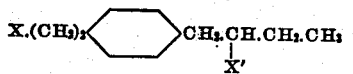

Disubstituted para ethyl butyl benzene

The structure of the polymer used in Example 4 consists of the radical —CH$_2$.CH$_2$— alternating with a group of four sulphur atoms. By employing other members of the group set forth in the above list, other properties can be obtained.

As to Class A compounds, as the number of carbon atoms in the organic radical increases, elasticity of the cured polymer produced therefrom decreases; resistance to hydrocarbon solvents decreases somewhat.

By choosing a compound from Class B, elasticity of the cured polymer produced therefrom is greater for a given number of carbon atoms, as compared with Class A compounds.

By choosing a compound from Group C, elasticity of the cured polymer produced therefrom is greater (for a given length of chain) than is the case in Groups A and B. Moreover the remarkable property of retaining the elasticity at low temperatures is also obtained thereby.

In general, Class D compounds produce properties similar to Class C. The common property in Class C and D compounds that is responsible for certain common characteristics of polymers made from members of these groups is unsaturation. The oxygen and sulphur of the ether and thio ether linkages in Class C compounds is unsaturated and so are the carbon atoms in Class D.

As to Class E, the tendency of the aromatic structure is to decrease elasticity and increase hardness, i. e., to produce compounds having a resinous, as distinguished from a rubbery, property.

The preparation of a typical disulphide polymer will now be described, together with an exposition of the influence of the organic radical in said disulphide polymers and a comparison of disulfide polymers with polysulphide polymers.

*Example 5.*—Preparation of a disulphide polymer by partial desulphurization of a polysulphide polymer:

3000 liters of 2 molar sodium tetrasulphide solution containing 1044 kilograms or 6000 gram mols of sodium tetra sulphide are treated with 8 kilograms of NaOH followed by 20 kilograms of $MgCl_2.6H_2O$ in a reaction vessel provided with coils for heating and cooling and an agitator. 5400 gram mols of B—B' dichlorethyl ether or 772 kilograms are slowly added to the polysulphide mix during a period of about three hours. The initial temperature should be about 130° F. and should not be permitted to rise above about 200° F. during the addition of the dichloro ether. After the dichloro ether is all in the reaction the temperature is raised to about 210° F. and held there for about an hour with continued agitation to complete the reaction. The reaction mix is then cooled to about 150° F. The reaction product is a polysulphide polymer in the form of a latex-like liquid of such character that it can be washed and settled out from the washing water. Upon standing, the latex settles from the mother liquor which is drawn off and an equal volume of water is added to restore the volume to that previously existing. The latex is then treated with 250 kilograms of sodium hydroxide to effect partial desulphurization. The temperature is again raised through a period of about 1 hour to about 210° F. and is maintained at that temperature for about 15 minutes. The latex is then allowed to settle out of the reaction liquid. The reaction liquid is then withdrawn from above the settled latex and is washed once by diluting largely with water and allowing the latex to settle again with subsequent withdrawal of the supernatent liquid. The latex is diluted with water and 100 kilograms of sodium monosulphide $Na_2S$ is added to the latex water mixture, the volume of which should be about 6000 liters. The mixture is heated with continuous agitation to 210° F. and that temperature is maintained for a period of about 1 hour to effect completion of the partial desulphurization, leaving the polymer substantially a disulphide reaction product.

All water soluble material is now removed from the latex by rapid dilution with clean water with subsequent settling out of the latex and removal of the supernatant liquid. After complete removal of water soluble material by the washing process, a further purification may be effected by blowing steam through the latex to remove volatile impurities.

Subsequent thereto, coagulation of latex and production of the polymer in massive form occurs as in Example 4.

The polymer so produced may be compounded as in Example 1, cured as in Example 2, and remolded as in Example 3.

The physical properties of the remolded compound are as follows:

Tensile strength_____lbs./sq. in__ About 1800
Elongation_____per cent__ About 400
Permanent set_____do____ About 15
Hardness_____ About 72
Lowest temperature at which elasticity is maintained_____ About —40° F.

Instead of the B—B' dichlorethyl ether used in the above Example 5, any other member of the list of compounds above set forth could be employed, and in this way I can therefore produce disulphide polymers characterized by a pair of sulphur atoms alternating with an organic radical R selected from any of the classes set forth in the above list, that is, where R is a saturated straight chain hydrocarbon, a saturated branched chain hydrocarbon, a structure characterized by an ether or thio ether linkage, a structure characterized by unsaturated carbon atoms, a structure characterized by an aryl group, and finally a miscellaneous group, and I will now point out certain relative differences between various classes of disulphide polymers (and the ultimate products produced therefrom) on the one hand and the corresponding tetrasulphide polymers on the other hand. Disulphide products from disubstituted straight chain hydrocarbons (Class A compounds) are hard resinous compounds, whereas the corresponding tetrasulphide products are of a rubbery character. Disulphide products derived from Class B compounds are of a definitely elastic and extensible character and possess these properties to a higher degree than the corresponding tetrasulphide products. The disulphide products produced from Class C compounds are much more elastic and rubbery than the tetrasulphide products produced from the same compounds. The relation between the properties of the disulphide products in Class D compounds and the corresponding tetrasulphide products is similar to the relation between the disulphide and tetrasulphide products from Class C compounds. The disulphide products from Class E compounds are in general of a resinous nature. The disulphide products from Class E compounds have a tendency to be hard and resinous in character and these properties are much more accentuated than in the corresponding tetrasulphide products.

As above mentioned, the disulphide products from Class A compounds have a tendency toward hardness and brittleness and the industrial uses of such products are therefore limited. I have found, however, that I can combine a disulphide polymer produced from a Class A compound with a disulphide polymer produced from a Class C or D compound and in this way produce a polymer which when cooled and subsequently remolded, possesses a unique combination of hardness and elasticity. I do this preferably, not by first making and isolating the polymers produced from members of the respective classes of compounds set forth, but rather by selecting a compound from Class A and another one from Class C or D and simultaneously reacting this mixture of compounds with sodium polysulphide, followed by partial desulphurization.

A specific example of such a procedure is set forth below:

Example 6.—5000 liters of 2 molar tetrasulphide solution containing 1044 kilograms or 6000 gram mols of sodium tetrasulphide are treated with 8 kilograms of caustic soda followed by 20 kilograms of MgCl₂.6H₂O in a reaction vessel provided with coils for heating and cooling, and an agitator. A mixture is made of 5000 gram mols of ethylene dichloride and 1000 gram mols of β—β' dichlorethyl ether and this mixture is slowly added to the polysulphide mix during a period of about 3 hours. The temperature is maintained at about 160° F. during this time with continuous agitation. After all the mixture of organic reactant is in the reaction, the temperature is raised to about 210° F. and held at that temperature for about an hour. The reaction product is a polysulphide polymer in the form of a latex-like liquid of such character that it can be washed and settled out from the washing water. Further procedure occurs as in Example 5, except that upon acidification coagulation into the form of a plastic mass does not occur, but rather the precipitation of a thin granular powder which settles to the bottom of the vessel in which acidification occurs and is then filtered off. It can be dried by any suitable means, as for example in a vacuum shelf dryer.

Thereafter it is compounded as in Example 1, cured as in Example 2, and then remolded as in Example 3.

This product has a unique combination of hardness and elasticity. Its hardness is over 100 as measured on the Shore durometer and this hardness is combined in such a high degree with elasticity that the product can be struck a heavy blow without shattering.

Example 7.—Preparation of a disulphide polymer by oxidation of an organic body having an —SH group attached to each of two different carbon atoms.

138 lbs. or 1 mol of dimercapto ethyl ether,

SH.C₂H₄.O.C₂H₄.SH are dissolved in 100 gallons sodium hydroxide solution containing 90 lbs. of NaOH; that is, an amount of NaOH slightly in excess of 2 mols. With this solution there is intimately mixed a freshly prepared suspension of magnesium hydroxide made by treating 10 pounds of

MgCl₂.6H₂O with 2 gallons of water and adding thereto a solution of 4 lbs. NaOH dissolved in 0.5 gallon of water. The entire mixture is then placed in a reaction vessel provided with stirring means and also means for heating, for example, steam coils. The mixture is subjected to stirring and to this is gradually added an oxidizing agent in the form of a solution of sodium polysulphide made, for example, by dissolving 348 lbs. or 2 mols of sodium tetrasulphide in one liter of water during a period of about ten minutes. The reaction occurs approximately at room temperature and is somewhat exothermic. The reaction is substantially completed after all the polysulphide has been added.

The completion of the reaction is indicated by withdrawing a sample, acidifying it and observing whether the odor of mercaptan is absent. Stirring may be continued until the reaction is completed as indicated by this test.

The polysulphide acts as an oxidizing agent and converts the dimercapto ethyl ether into a complex polymer or plastic. The advantage of the magnesium hydroxide is that the said polymer or plastic is produced in the form of a latex-like liquid which has the unique property of being capable of intimate mixture with water and settling out subsequently by the action of gravity. This property permits intimate and thorough washing to remove soluble impurities. Acidification of the latex-like liquid causes the separation of polymer as an agglomerated mass, the removal of the impurities from which would be a difficult problem. It is therefore highly desirable to accomplish the washing while this mass is in dispersed form, inasmuch as under such conditions the high degree of dispersion of the polymer permits an extremely thorough removal of the soluble impurities by washing. The difficulty of transporting the latex in agglomerated form, and the ease with which it sticks to parts of apparatus, such as the stirrer, also makes it advisable to produce the polymer in the reaction vessel in its dispersed latex-like form, from which vessel it can be readily removed because of its fluid characteristics. If the polymer were produced in the reaction vessel in its coagulated rubbery form, it would be difficult to remove it therefrom and it would be contaminated with the reagents used in its manufacture.

Washing of the polymer in its dispersed condition may be accomplished in the reaction vessel by stirring it up with successive quantities of water, settling and drawing off the supernatant wash liquid. The washing can, of course, be accomplished in a different vessel. In any event, it is desirable to preserve the polymer in its dispersed condition until after removal from the reaction vessel.

The washed latex is then transferred to a second vessel where coagulation or agglomeration is produced by acidification. Sufficient acid may be added for this purpose until the mother liquid is acid to methyl orange or brought to a pH of about 3. The coagulated polymer is then dehydrated by any suitable method, e. g., milling, mastication or kneading. In such processes, considerable heat is generated which, together with the mechanical action, causes the removal of water.

In the above example, instead of sodium hydroxide as the agent for dissolving the dimercapto compound, other alkaline hydroxides could be used, for example, potassium, ammonium, lithium, calcium, barium, strontium, and in general any other alkaline materials which will not form highly insoluble sulphides.

Instead of magnesium hydroxide, other gelatinous hydroxides may be employed, for example, aluminum hydroxide, chromium hydroxide, ferric hydroxide. Moreover, dispersing agents other than hydroxides may be employed, for example, gelatin, albumin, casein, agar, soluble cellulose esters, etc.

Instead of sodium polysulphide, other polysulphides may be employed, e. g. potassium and ammonium polysulphide or any other soluble polysulphide. Other oxidizing agents may be used, for example, oxygen, air, ozone, hypohalites, and in general any oxidizing agent effective in an alkaline solution, for example, hydrogen peroxide and metallic peroxides, perborates, chromates, dichromates, manganates and permanganates, etc. The reaction is preferably carried on under alkaline conditions because it has been found that the reaction is very favorably influenced by such conditions.

Although in the above example, the step of agglomerating or coagulating the polymer was specifically described, it is in some cases advantageous to preserve the polymer in its dispersed form as such, e. g., for use in coating and impregnating various materials.

The product obtained in this case is a white coagulum which, upon drying, is in thin sheets, a pale amber translucent and highly elastic solid.

It is compounded as in Example 1, cured as in Example 2, and remolded as in Example 3.

In the above example, instead of dimercapto ethyl ether, any other member of the list above set forth can be used, where X and X' signify respectively an —SH group attached to each of two different carbon atoms.

In general, polymers and products produced by oxidizing mercapto compounds, as described, have properties substantially the same as those obtained by the polysulphide reaction followed by partial desulphurization.

As above mentioned, and specifically described in Example 6, a product having a unique combination of hardness and elasticity may be produced by preparing a blend of a disulphide polymer produced from a Class A compound with a disulphide polymer produced from a Class C or D compound. According to Example 6 this blend was conveniently made by reacting a mixture of a Class A compound and a Class C or D compound with an alkaline polysulphide and effecting a partial desulphurization of the product. Similar results can be obtained by mixing a Class A compound and a Class C or D compound, where however X and X' are both —SH groups and then oxidizing this mixture to produce the blended disulphide polymer according to the technique set forth in Example 7.

Formation of polysulphide polymers occurs as follows:

A. X.R.X'+Na-S-S-Na=

$$\overset{\|}{\underset{\|}{S}}$$

X.R.S-S.Na+NaX'

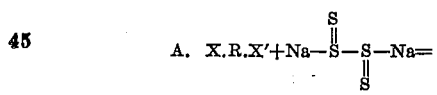

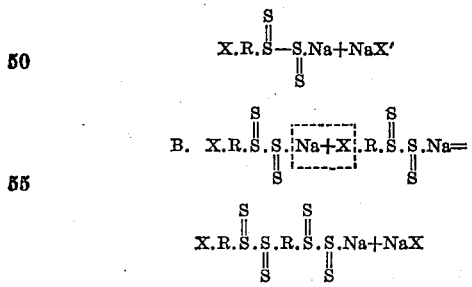

In this series of reactions X and X' represent replaceable substituents attached to each of two different carbon atoms, respectively, these carbon atoms being a part of an organic radical represented by R. Such replaceable substituents are split off during the reaction and may be halogen, sulphate, nitrate, phosphate, carbonate, acetate, propionate, etc.

This continues until a long chain is built up having the formula

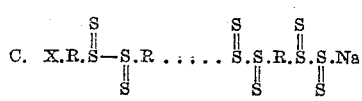

This loses the substituent X and acquires —SH terminals as follows:

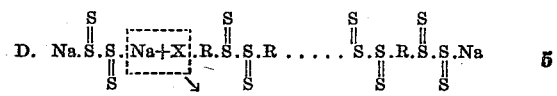

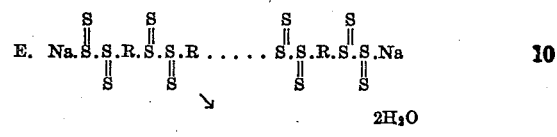

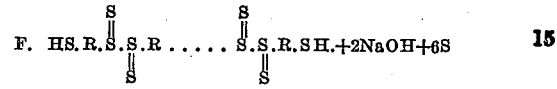

Thus high molecular weight, long chain polymers may be built up from relatively low molecular weight starting materials, by reaction with an alkaline polysulphide, e. g., sodium, potassium, ammonium, calcium, barium and other polysulphides.

The reaction is of great commercial importance because of the valuable and unique properties of the polymers, i. e., the products synthesized by the reaction mentioned.

The starting material has two replaceable, i. e., substituents, each on a different carbon atom. Replacement of one of these substituents produces a molecule, which has the power to join hands with a similar molecule, as shown above in Equations A to F. This joining goes on until a long chain is built up, the general structure of which is substantiated by numerous reactions and tests including X-ray diagrams.

Partial desulphurization of polysulphide polymers to disulphide polymers occurs as follows:

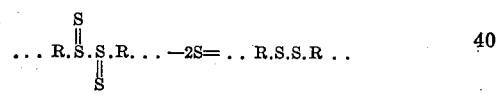

Formation of disulphide polymers by oxidation of dimercapto bodies occurs as follows:

The mechanism of polymer formation consists in the removal of H-atoms from mercaptan terminals by oxidation thus:

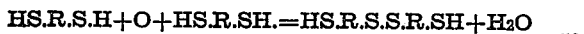

where oxygen or an oxygen-yielding oxidizing agent is used. The dimer thus formed again reacts with oxygen to form a tetramer. This then reacts to form an octomer and finally a long chain polymer results with mercaptan or mercaptide terminals. Thus, when the reaction is carried out in a sodium hydroxide solution the polymer has the formula

In this condition the polymer remains in a highly dispersed form in alkaline solution in the presence of a dispersing agent and can be washed free of impurities, prior to coagulation. Owing to this property, the thoroughly washed dispersion or latex yields a coagulum free from water soluble impurities and electrolytes, which if allowed to remain would impair its useful properties.

Upon acidification, the dispersion is coagulated and the polymer separates as a rubber-like plastic mass. In that condition the metallic terminals are converted into hydrogen and the polymer has the formula

HS.R.S.S.R.S.S. . . . R.S.S.R.SH

X-ray patterns show that the maximum distance between the organic radicals is not more than two sulphur atoms, even in the case of the polysulphidepolymers.

The polysulphidepolymers therefore have the structure

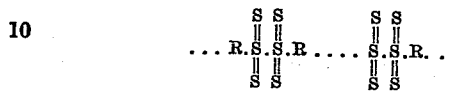

Hexasulphide

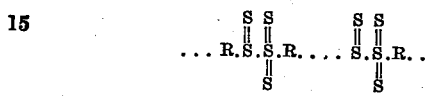

Pentasulphide

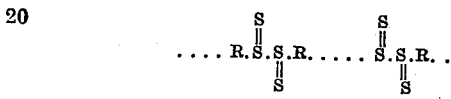

Tetrasulphide

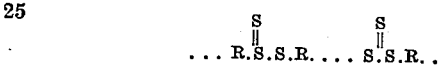

Trisulphide

In these polymers, the sulphur joined directly to the organic radicals is firmly bound. The other sulphur atoms are loosely bound and can readily be removed by heating with a partial desulphurizing agent, e. g. NaOH or $Na_2S$ or both.

As already mentioned, one of the particular uses of the present invention is the manufacture of complex shapes, such as printing plates. When printing plates are made of metal, many difficulties are encountered and unsatisfactory results are often obtained. The printing surfaces of such plates are rigid and unyielding and therefore great care must be exercised in placing them in the machines, and it is often necessary to take the plates out of the machines and place thin shims under them to raise or adjust them to the proper height for printing. This sometimes requires repeated effort and final adjustment and must be left to the judgment of the pressman. If printing surfaces extend too far outwardly there is danger of cutting the surface that is to be printed or of breaking such a surface when it is brittle. The metal surfaces are also sometimes attacked by the inks and by the solvents that are used for removing hardened ink from the plates. The plates must be protected from rust or corrosion while they are not in use, thereby requiring careful attention for keeping them uninjured.

By the present invention, printing plates are made rapidly and economically and these plates are not attacked by inks or solvents for inks and no special care need be exercised in keeping them for reuse.

I claim:

1. The process which comprises subjecting to heat and pressure a mass of comminuted particles of a cured polymeric product substantially identical with that obtained by reacting an alkaline polysulphide and an organic compound having two carbon atoms to each of which is attached a substituent which is split off during said reaction whereby a polymer is obtained and curing said polymer.

2. The process of subjecting to heat and pressure a mass of comminuted particles of a polymeric product comprising a precured polymer substantially identical with that obtained by reacting an alkaline polysulphide with an organic compound having two carbon atoms to each of which is attached a substituent which is split off during the reaction, thereafter reacting said polymer with a desulphurizing agent and partially desulphurizing it and thereafter curing said partially desulphurized polymer.

JOSEPH C. PATRICK.